(12) United States Patent
Stalder et al.

(10) Patent No.: US 8,111,352 B2
(45) Date of Patent: Feb. 7, 2012

(54) ANISOTROPIC OPTICAL DEVICE WITH VARYING LOCAL IMAGEWISE AND METHOD FOR MAKING SAME

(75) Inventors: Martin Stalder, Oberwil (CH); Mohammed Ibn-Elhaj, Allschwil (CH); Franco Moia, Frenkendorf (CH)

(73) Assignee: Rolic AG, Zug (CH)

( * ) Notice: Subject to any disclaimer, the term of this patent is extended or adjusted under 35 U.S.C. 154(b) by 1387 days.

(21) Appl. No.: 11/632,765

(22) PCT Filed: Jun. 30, 2005

(86) PCT No.: PCT/CH2005/000361
§ 371 (c)(1),
(2), (4) Date: Jan. 18, 2007

(87) PCT Pub. No.: WO2006/007742
PCT Pub. Date: Jan. 26, 2006

(65) Prior Publication Data
US 2007/0196616 A1      Aug. 23, 2007

(30) Foreign Application Priority Data
Jul. 21, 2004   (EP) .................................. 04405464

(51) Int. Cl.
*G02F 1/1335* (2006.01)
*G09G 3/36* (2006.01)
(52) U.S. Cl. ............ 349/64; 349/106; 349/109; 345/88
(58) Field of Classification Search .................. 349/64, 349/106, 109; 345/88
See application file for complete search history.

(56) References Cited

U.S. PATENT DOCUMENTS

| | | | |
|---|---|---|---|
| 4,705,356 A | 11/1987 | Berning et al. | |
| 5,549,953 A | 8/1996 | Li et al. | |
| 5,942,030 A * | 8/1999 | Schuhmacher et al. | 106/493 |
| 6,268,961 B1 * | 7/2001 | Nevitt et al. | 359/488 |
| 6,451,414 B1 * | 9/2002 | Wheatley et al. | 428/212 |
| 2004/0101676 A1 * | 5/2004 | Phillips et al. | 428/323 |
| 2004/0105963 A1 * | 6/2004 | Bonkowski et al. | 428/195.1 |
| 2005/0082819 A1 | 4/2005 | Tompkin | |
| 2007/0020404 A1 * | 1/2007 | Seiberle et al. | 428/1.2 |
| 2007/0273142 A1 * | 11/2007 | Tompkin et al. | 283/72 |

FOREIGN PATENT DOCUMENTS

| | | |
|---|---|---|
| DE | 10216562 C1 | 12/2003 |
| JP | 11151877 A | 6/1999 |
| JP | 2004163797 A | 6/2004 |
| JP | 2004177636 A | 6/2004 |

(Continued)

OTHER PUBLICATIONS

Ibn-Elhaj, M. et al., "Optical Polymer Thin Films with Isotropic and Anistropic Nano-Corrugated Surface Topologies", Nature, Apr. 2001, p. 796-799, vol. 410.

(Continued)

*Primary Examiner* — Hoan C Nguyen
(74) *Attorney, Agent, or Firm* — Sughrue Mion, PLLC

(57) ABSTRACT

The present invention relates to a new optical component comprising an anisotropic diffuser (5,10) with patterned anisotropy; and means (9, 11, 14, 16, 17, 20, 21, 30, 32) for providing a colorshift observable upon changing viewing angle (6) and/or changing angle of incident light (2). It also relates to methods for making such an optical component and uses of such optical components as security elements with a very high level of security.

31 Claims, 10 Drawing Sheets

FOREIGN PATENT DOCUMENTS

WO     WO 2004/095090 A     11/2004

OTHER PUBLICATIONS

Figure 2A:
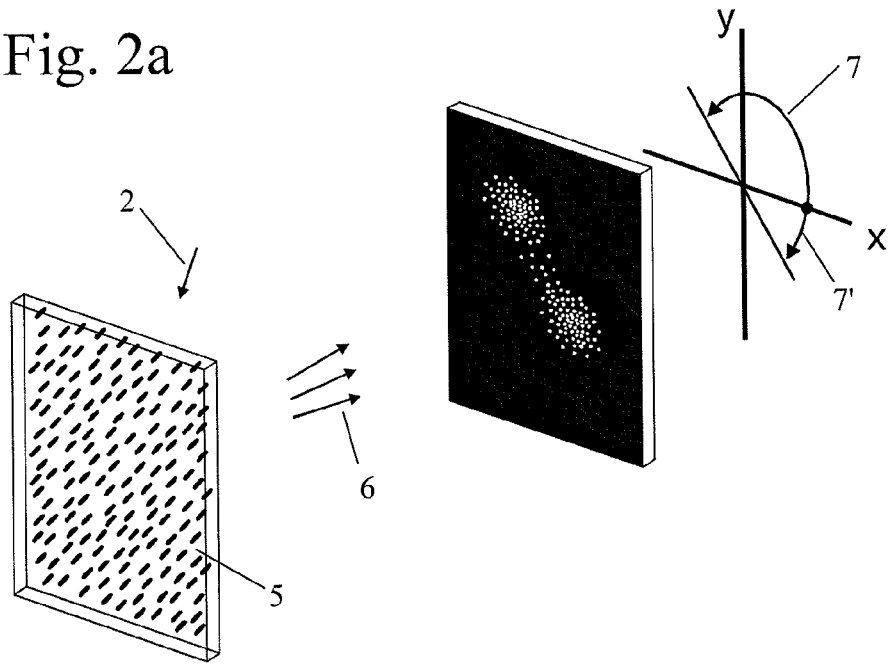

Ibn-Elhaj, M. et al., "Monomer-Corrugated Directional Thin-Film Reflectors for Bright LCDs" Asia Display / IDW/'01. Proceedings of the 21$^{st}$ Century Display Research Conference in Conjunction with the 8$^{th}$ International Display Workshops. IDRC, Oct. 16, 2001, p. 1-6, vol. CONF. 21/8, Nagoya, Japan and San Jose, CA.

Mohammed Ibn-Elhaj & Martin Schadt et al., "Photo-aligned Nano- and Micro-corrugated Novel Optical Thin Films for LCDs" 'Online!, Jun. 2002, p. 1-4.

Schadt, Martin, "Photo-alignment and optical patterning of Self-Assembling Molecular Thin-Film Configurations", National Science Foundation Workshop on Fundamental Research Needs In Photonic Material Synthesis and Processing at the Interface, Center for Optoelectronics and Imaging, University of Rochester, 'Online!, Apr. 28, 2003, p. 1-13.

* cited by examiner

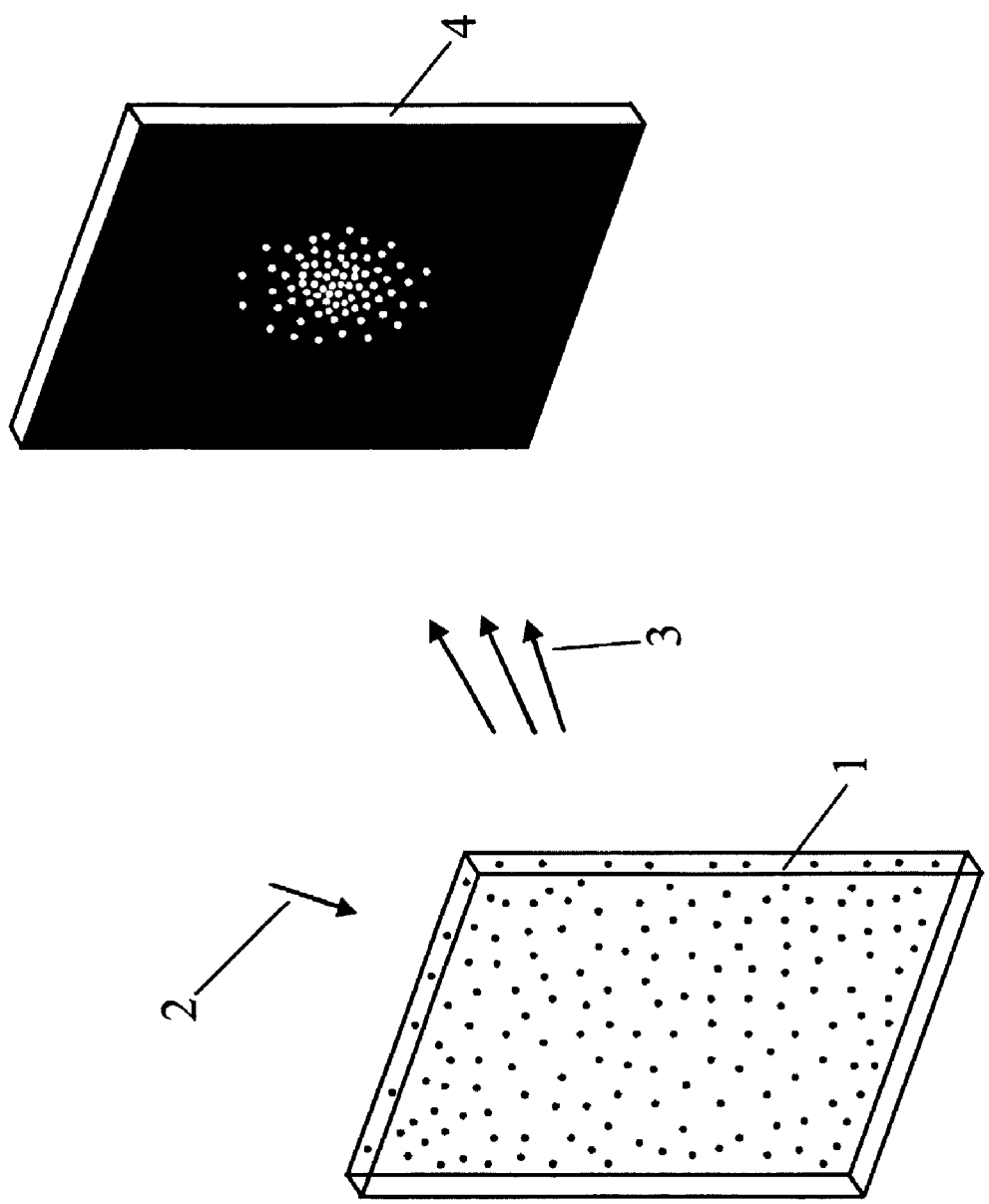

ANISOTROPIC OPTICAL DEVICE WITH VARYING LOCAL IMAGEWISE AND METHOD FOR MAKING SAME

TECHNICAL FIELD

The present invention relates to anisotropic optical devices and methods for making such devices. The proposed devices can be used in the field of optical security devices and the like.

BACKGROUND OF THE INVENTION

Due to further increased fraud and counterfeit of products and documents novel anticounterfeit measures are required more than ever. For many years holograms have been the preferred security-technology and many different generations of hologram-based security features have been fabricated. Meanwhile, this technology is more than 30 years old and therefore well known and widespread. This situation represents a security risk since many people have access to the hologram technology. With the availability of digital hologram printers, the path to easy to use holographic mastering systems have further increased. These printers allow the production of many different types of holograms and a minimal knowledge of holographic set-ups or laser writers is required. Such equipment allows the preparation of masters for the subsequent metal master fabrication and the replication into thin-films in large volumes. Therefore, due to the widespread possibilities of generating holographic structures, holography is losing importance in the field of security elements.

However, in the field of security devices there is a permanent need for new and different devices in order to have the possibility to reduce the risk of reproduction also by changing the type of security devices.

An example of such an approach is explained in the patent application WO-01/03945, where the optical effect is e.g. due to the combination of holographic or grating structures and a colourshifting multi-layer interference effect.

Furthermore anisotropic diffusers and reflectors have been proposed with patterned anisotropy in Ibn-Elhaj et al., "Optical Polymer Thin Films With Isotropic And Anisotropic Nano-Corrugated Surface topologies", Nature, 2001, vol. 410, p. 796-799. For the making of the structures use is made of a so called monomer corrugation technology (MC), which relies on the fact that phase separation of a mixture or blend applied to a substrate is induced by crosslinking with exposure to UV radiation. The removal of non-crosslinked components leaves a structure with a specific surface topology comprising grooves, dips and/or pores. With suitably scaled surface topologies, directional light diffusers may be built. Among other substrates, the use of an aluminum mirror as a substrate is proposed, onto which a patterned MC-film is produced with the above UV-induced phase separation of the mixture and subsequent removal of non-cross-linked material. Thereby, instead of a directional transmission of the pattern, a directional reflector is made available with the pattern being visible through viewing angle dependent variation in brightness and contrast.

SUMMARY OF THE INVENTION

An objective of the present invention is therefore to provide a new and efficient optical component which may be used as a security element. Additionally, the object of the present invention is to provide methods for making such optical components and uses thereof.

An object of the present invention is therefore an optical component according to claim 1, a method according to claim 23 and a use of the optical component according to claim 27.

A key feature of the invention is the fact that an optical component is provided comprising the combination of an anisotropic diffuser with patterned anisotropy with means for providing a colourshift observable upon changing viewing angle and/or changing angle of incident light. Thereby, preferentially the anisotropy is imagewise locally varying, for example in pixellated manner. In particular for security purposes it proves to be advantageous to provide an optical component in which the anisotropy shows a viewing angle dependent positive/negative image flipping upon tilting or rotating of the optical component. Normally the anisotropic diffuser with patterned anisotropy has a substantially non-periodic optically effective structure.

In contrast to the well-known holographic structures, an anisotropic diffuser shows very clear and distinct image flipping upon changing of the viewing angle. It however does not easily allow the combination with colourshift effects. The proposed combination of an anisotropic diffuser with distinct means for providing a well controlled colourshift provides the possibility of a superposition of distinct image flipping with well controlled and uniform colourshift. Since when using holographic structures a possible image flipping is always accompanied by concomitant colourshifts (often perceived as rainbow effects), the provision of a holographic structure with an additional mean for providing a colourshift will not lead to a well separated control of the image flipping and the colour flipping. Surprisingly however, the presently proposed combination of an anisotropic diffuser with patterned anisotropy with means for providing a colourshift allows a much clearer combination of image flipping and colourshift. Since the two effects are better separated than if instead of the anisotropic diffuser a periodic holographic structure is used, the two effects can be efficiently controlled and for example can be matched with each other. The for example possible specific coordination of the image flipping with the colourshift allows a surprising increase in the achievable security level of the devices in that for example a first image appear as under a first viewing angle in a first colour, and upon changing viewing angle almost without transmitional effects there appears the second image different from the first one in the second colour.

According to a first preferred embodiment of the optical component the means for providing a colourshift are provided as a colourshift layer structure. The anisotropic diffuser and the colourshift layer structure may thereby be located one behind the other as seen from the viewing direction. The anisotropic diffuser and the colourshift layer may be provided as individual layers or films or coatings, but they may also be provided as a partially or fully integrated structure.

According to another preferred embodiment of the optical component, the anisotropic diffuser is based on a liquid crystalline, preferentially nematic, material, which may be polymeric, monomeric or oligomeric, crosslinkable or non-crosslinkable.

The anisotropic diffuser may comprise a topologically structured corrugated surface structure. The topologically structured corrugated surface structure may be covered by a protective layer, by an interface layer or by a spacer film or by a reflection metal layer. While such topologically structured corrugated surface structure may be obtained by means of embossing techniques, i.e. by using a stamper which embosses the desired three-dimensional structure into a matrix material, it is also possible to obtain such surface structure by other methods, e.g. optical methods. Therefore, the topologically structured corrugated surface structure may be given as obtainable by making a mixture of at least two materials of which one is crosslinkable and the other is non-crosslinkable, applying the mixture to a substrate, cross-linking at least a substantial portion of the crosslinkable material, and removing at least a substantial portion of the non-crosslinkable material, wherein preferentially the crosslinkable material is maintained in oriented state, e.g. by means of an underlying orientation layer or an orientating substrate surface, during cross-linking.

According to another preferred embodiment of the present invention, the means for providing a colourshift comprise an interference film or coating. The interference film or coating may comprise a multi-layer thin-film system based on dielectric materials, wherein the dielectric materials in different layers have different index of refraction. The interference film or coating may also represent a Fabry-Perot-resonator. In the latter case, the interference film or coating may comprise at least one partially transparent first metal film, and a second metal film and between those metal films a preferentially dielectric layer. The use of such a Fabry-Perot-resonator allows a particularly compact and efficient integrated structure, in that the anisotropic diffuser with patterned anisotropy is provided on a substrate, in that said anisotropic diffuser with patterned anisotropy comprises a topologically structured corrugated surface structure which is covered by a reflection metal layer, and in that seen from the viewing direction said anisotropic diffuser is directly covered by the dielectric layer of the Fabry-Perot-resonator.

According to a further preferred embodiment, the means for providing a colourshift comprise a cholesteric film, layer or coating. The cholesteric film may be tinted, and/or it may be cross-linked.

According to another preferred particularly compact and integrated embodiment, the anisotropic diffuser with patterned anisotropy is provided on a substrate, wherein said anisotropic diffuser with patterned anisotropy comprises a topologically structured corrugated surface structure which is covered by a reflection metal layer, and wherein seen from the viewing direction said anisotropic diffuser is directly covered by the cholesteric layer.

It is also possible to provide an optical component, wherein the surface, layer or coating of the cholesteric film has a topologically structured corrugated structure and forms the anisotropic diffuser with patterned anisotropy. In this case, it is for example possible to coat the cholesteric film on to such a topologically structured corrugated structure, or it is possible to produce the cholesteric film directly with such a topologically structured corrugated structure.

According to another preferred embodiment of the present invention, the means for providing a colourshift are provided as at least one film which is coated, printed, laminated, hot- or cold-stamped on a substrate, wherein preferentially the substrate is made of plastic material such as polyester, polyethylene, polypropylene, PET (polyethylene terephthalate) or blends thereof or is made of glass, metal or paper or combinations thereof.

The present invention furthermore relates to a method for making optical component as described above. Preferentially, this method is characterised in that means for providing a colourshift observable upon changing viewing angle and/or changing angle of incident light are coated, printed, laminated glued, hot- or cold-stamped onto a substrate and subsequently covered or coated or provided with an anisotropic diffuser with patterned anisotropy. In the alternative, the method is characterised in that means for providing a colourshift observable upon changing viewing angle and/or changing angle of incident light are coated, printed, laminated, glued, hot- or cold-stamped onto a substrate onto an anisotropic diffuser with patterned anisotropy.

According to a preferred embodiment of the method, a topologically structured corrugated surface structure as an anisotropic diffuser with patterned anisotropy is made by making a mixture of at least two materials of which one is crosslinkable and the other is non-crosslinkable, applying the mixture to a substrate, cross-linking at least a substantial portion of the crosslinkable material, and removing at least a substantial portion of the non-crosslinkable material, wherein preferentially the crosslinkable material is maintained in oriented state, e.g. by means of an underlying orientation layer or an orientating substrate surface, during cross-linking.

Alternatively, it is possible to make a topologically structured corrugated surface structure as an anisotropic diffuser with patterned anisotropy by ultraviolet casting or hot embossing using a three-dimensionally structured stamper.

If the means for providing a colourshift comprise a cholesteric film, layer or coating, such cholesteric element may be made either by applying a cholesteric film, e.g. by lamination, or by coating a cholesteric material in its liquid crystalline form and cross-linking the material after the coating process, preferably either by using actinic irradiation or by using heat.

The present invention also relates to preferred uses of optical components as outlined above. Preferably, the optical components are used as security elements, i.e. for any purpose which should prevent forgery, counterfeiting, copying or the like. To this end, the security element can be applied to or incorporated into a security document. Such security document may for example be a banknote, a passport, a license, a stock, a bond, a coupon, a cheque, a credit card, a certificate, a ticket, or any other document the copying of which shall be hampered. Other applications include for instance brand and product protection devices and the like. The security element may thereby take the form of a tag, security strip, label, fibre, thread or patch but it may also be formed integrally with the security document.

The security elements may also be applied to or incorporated into means for packaging, like wrapping paper, packaging box, envelope, and also here the security element may take the form of tag, security strip, label, fibre, thread or patch or the like.

Another preferred use of optical components according to the invention are decorative applications.

Further embodiments of the present invention are outlined in the dependent claims.

SHORT DESCRIPTION OF THE FIGURES

Figure 2B:
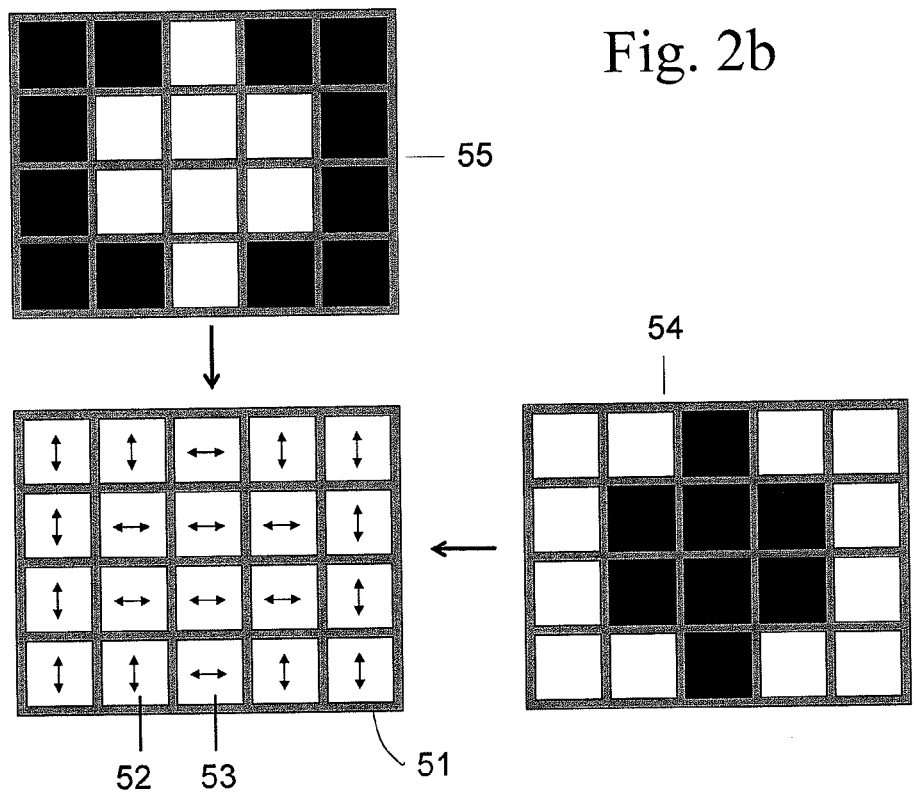
Figure 3:
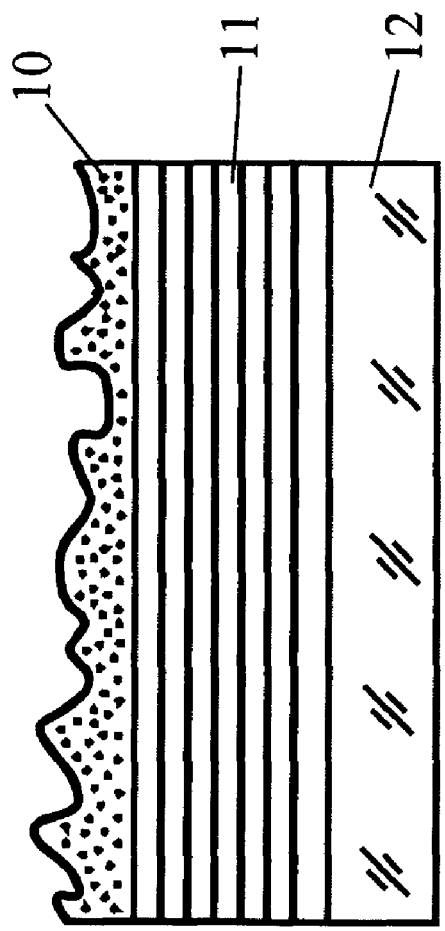
Figure 4:
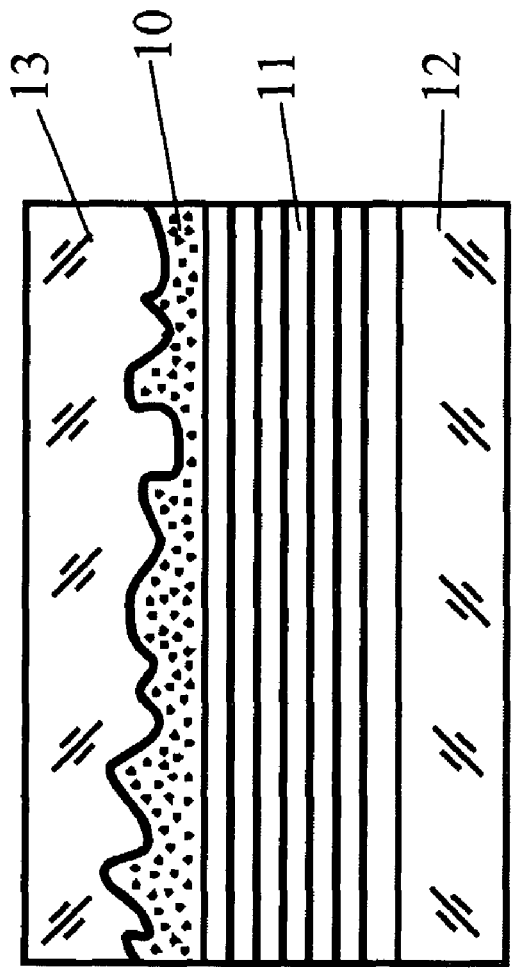
Figure 5:
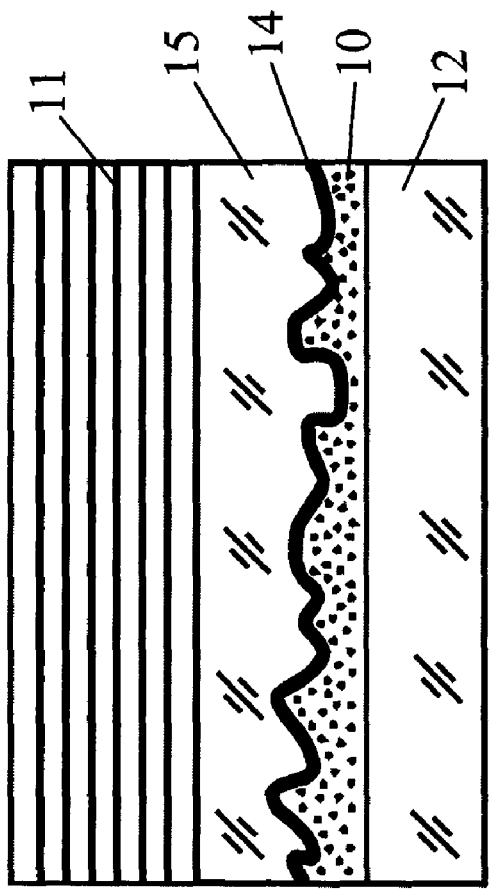
Figure 6:
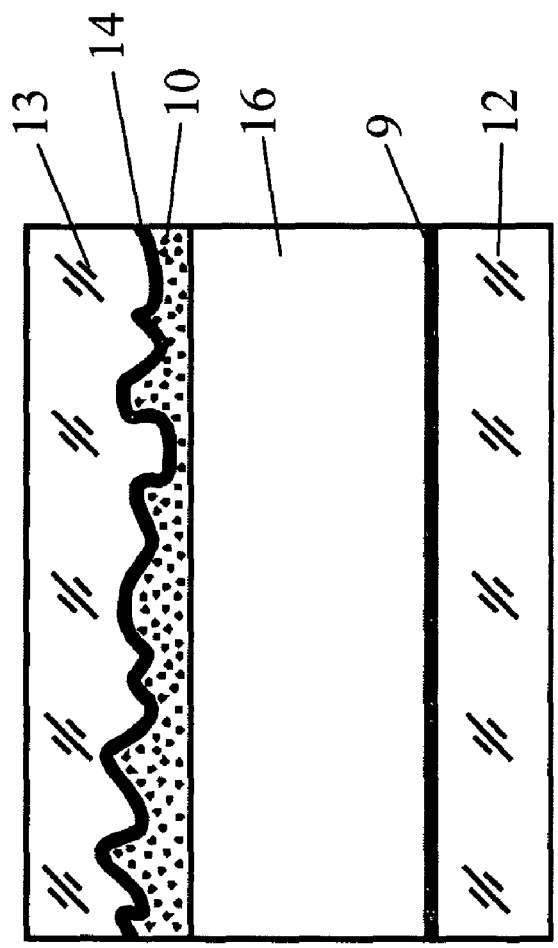
Figure 7:
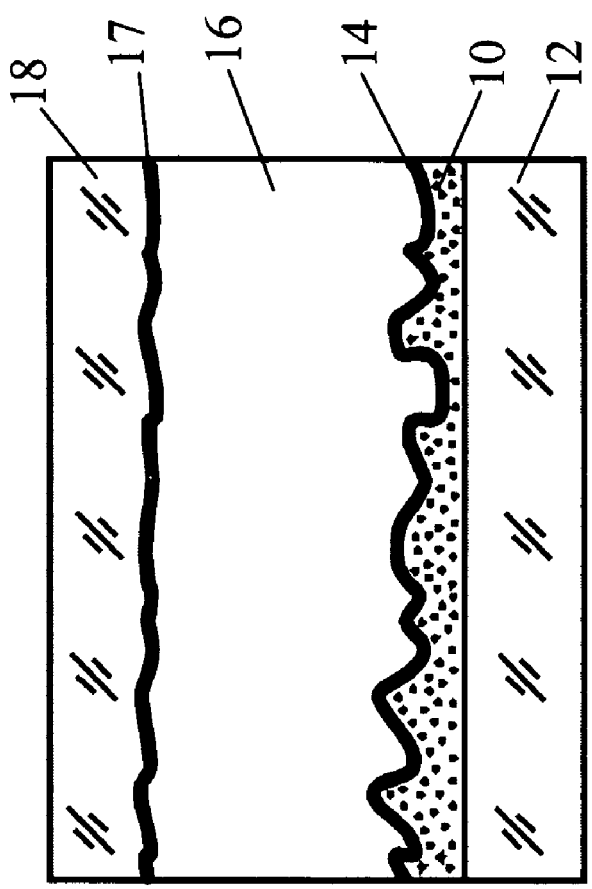
Figure 8:
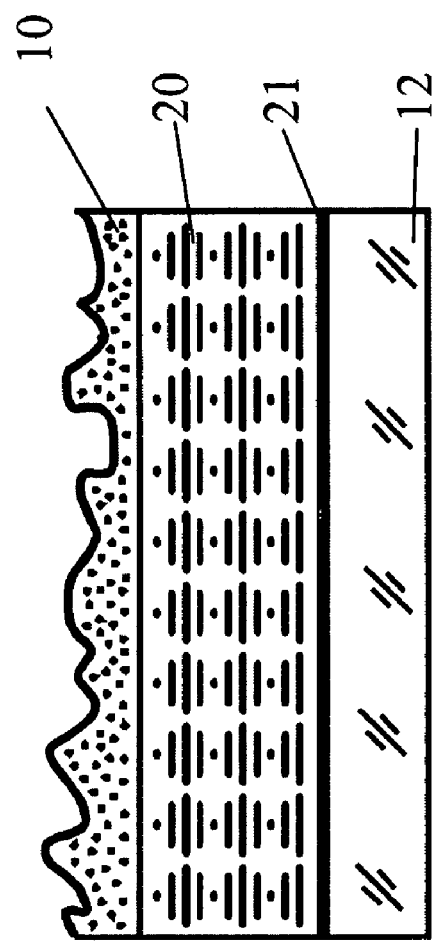
Figure 9:
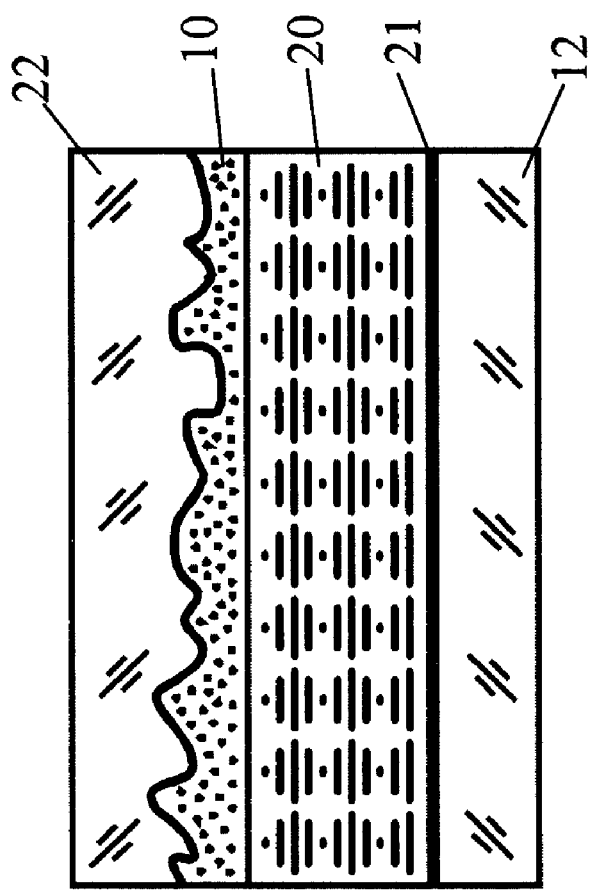
Figure 10:
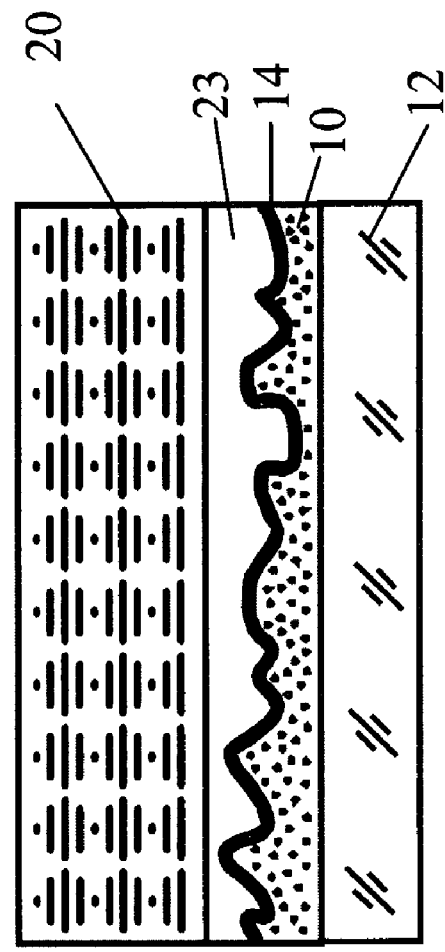
Figure 11:
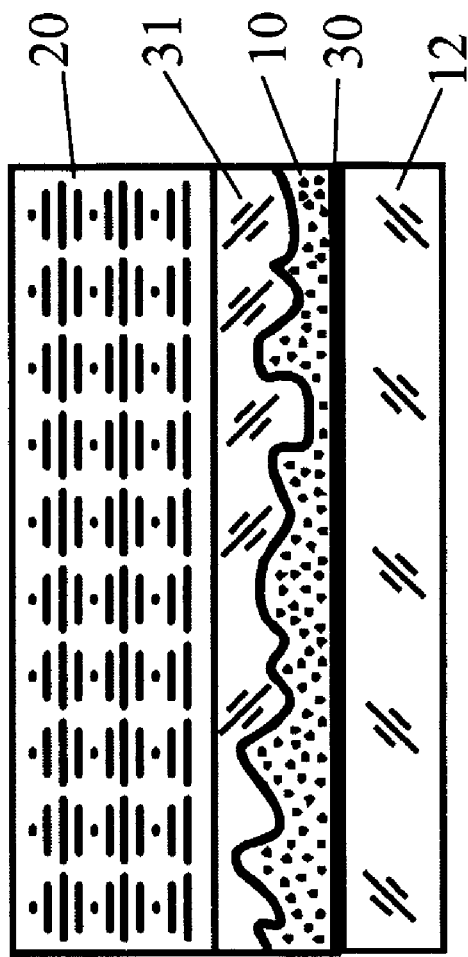
Figure 12:
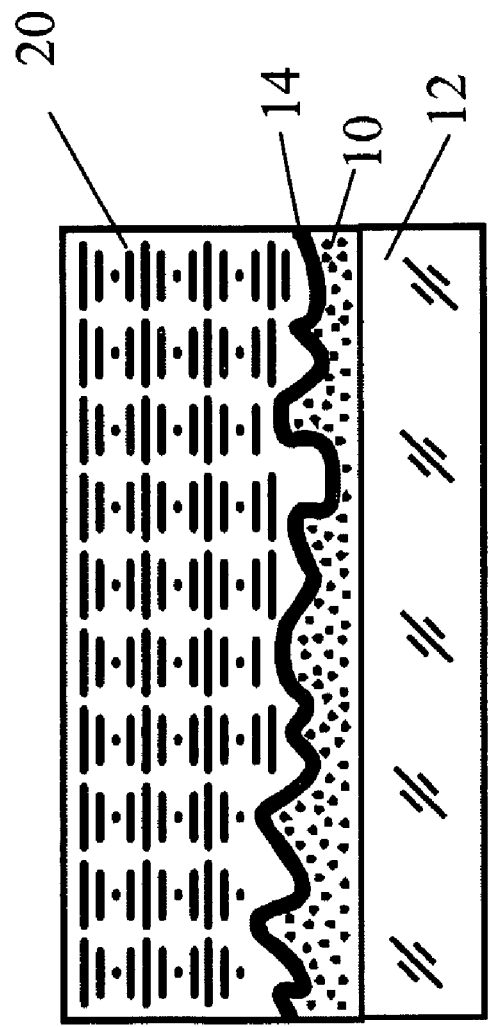
Figure 13:
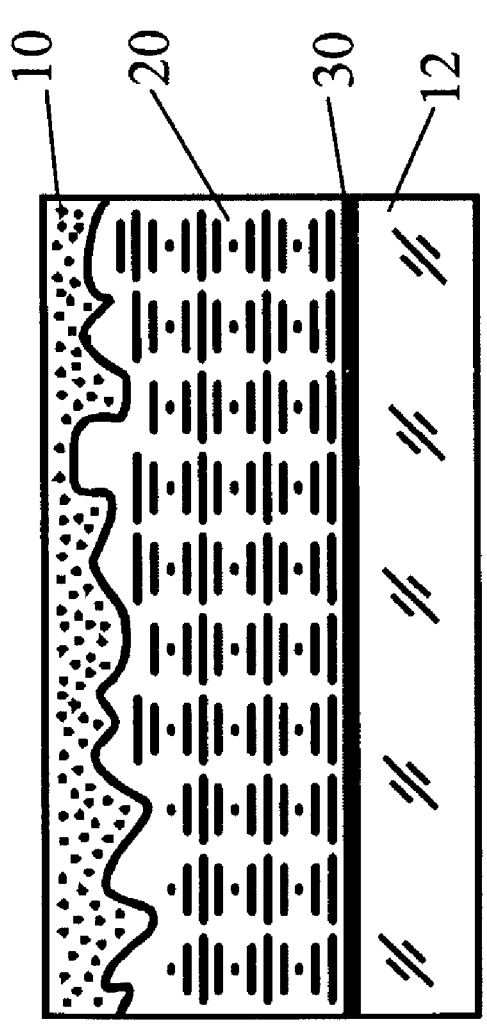
Figure 14:
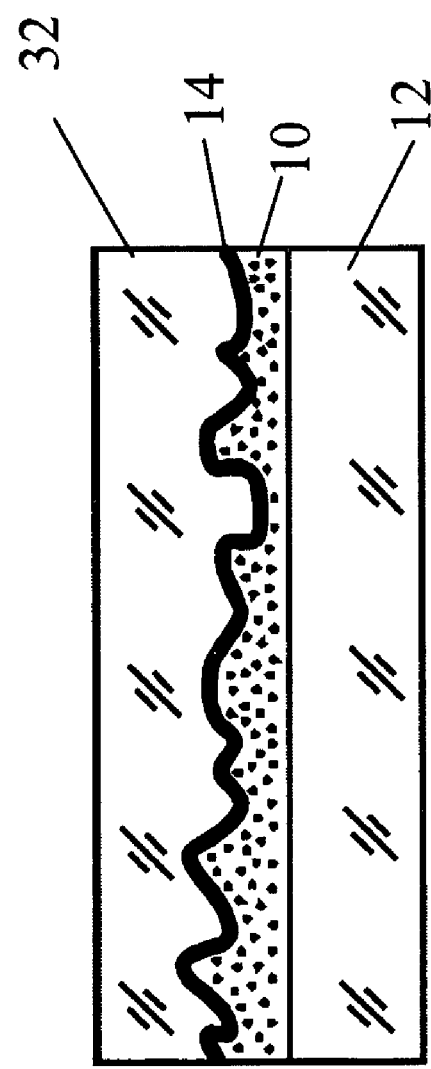
Figure 15:
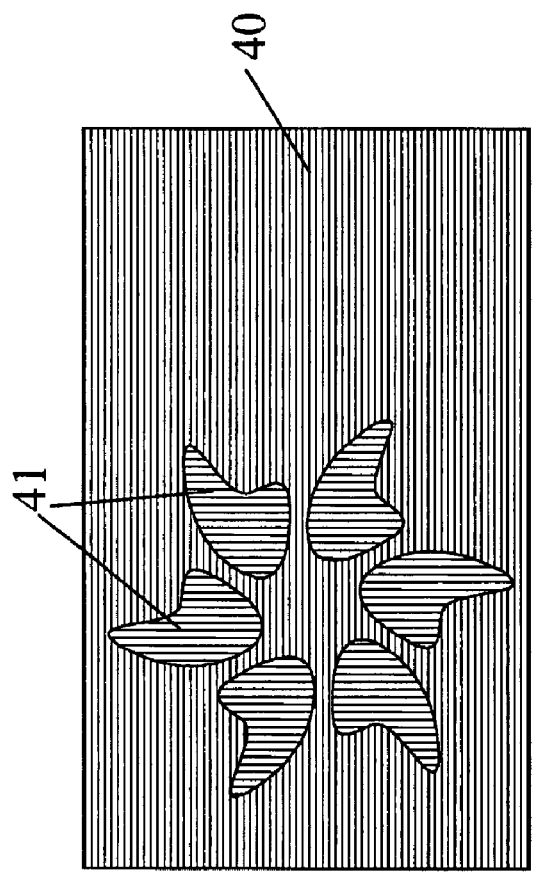
Figure 16:
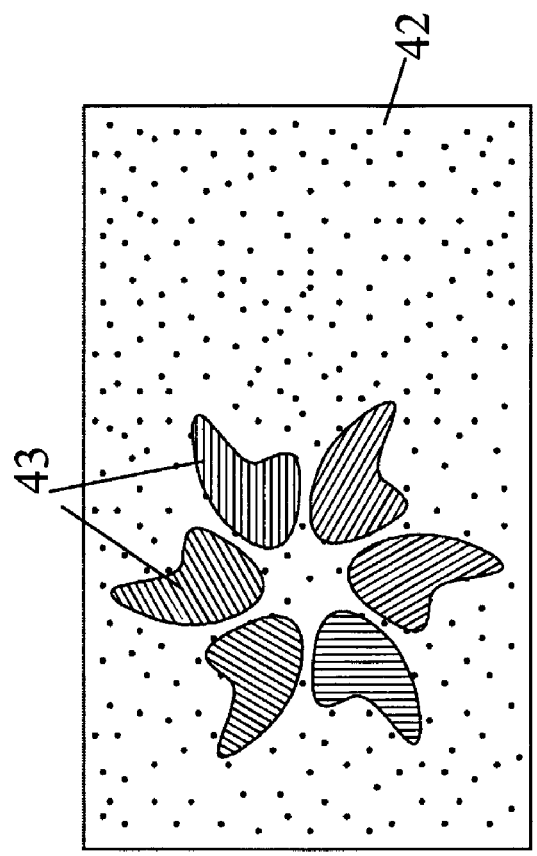
Figure 17:
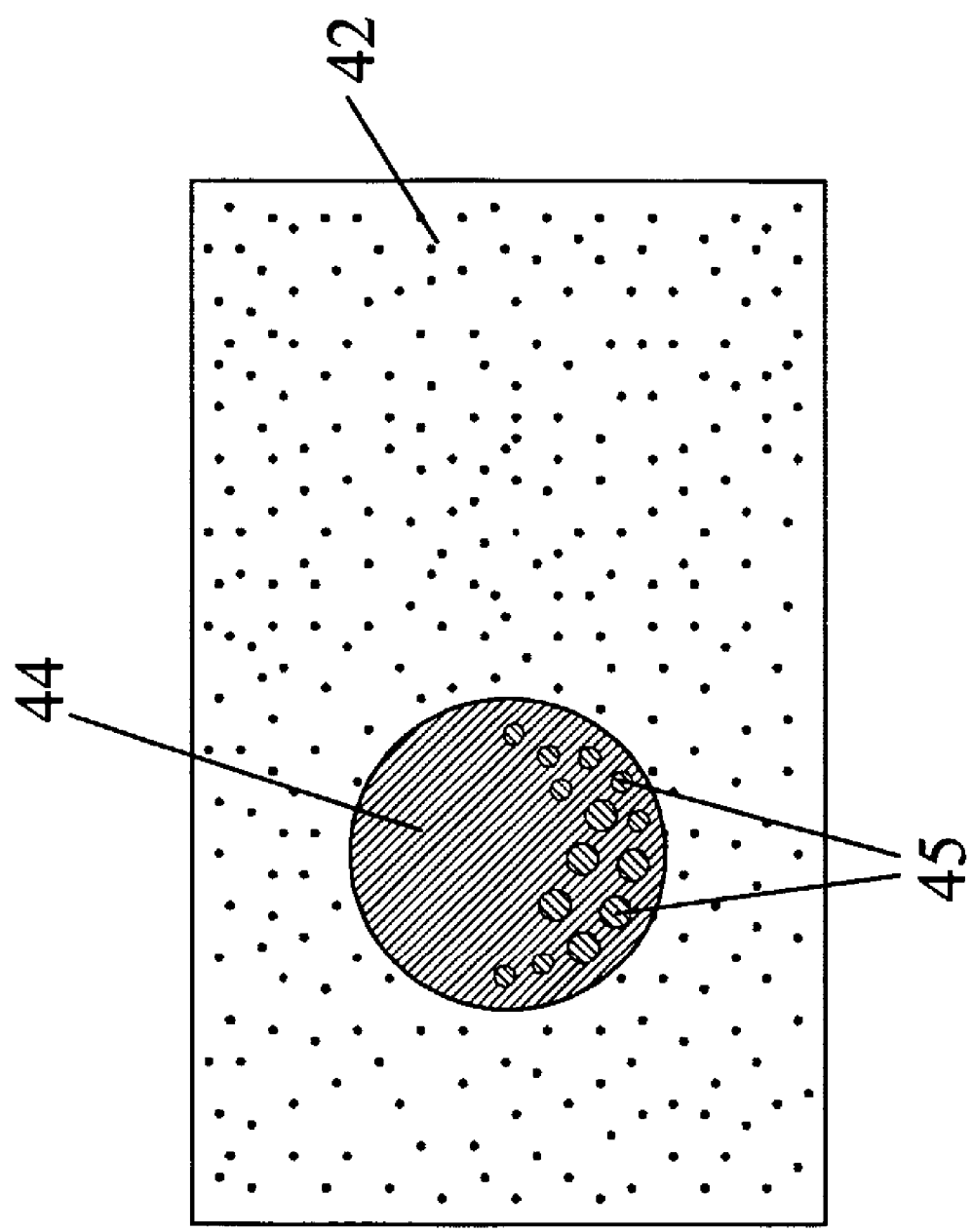

In the accompanying drawings preferred embodiments of the invention are illustrated, showing:

In the accompanying drawings preferred embodiments of the invention are illustrated, showing:

FIG. 1 the illumination of an optical device with an isotropic scattering surface (state of the art);

FIG. 2a the illumination of an optical device with an anisotropic scattering surface (state of the art);

FIG. 2b anisotropic diffuser with patterned anisotropy and optical appearance from two different viewing directions;

FIG. 3 the basic combination of an anisotropic scattering layer on top of a reflecting interference film;

FIG. 4 a device according to FIG. 3 with an additional surface protection coating;

FIG. 5 a device according to FIG. 4 with a scattering film on the substrate and the surface coated with a reflection layer followed by an interface layer;

FIG. 6 a colourshift device representing a simple Fabry-Perot-resonator, wherein one reflector is an anisotropic scattering reflector;

FIG. 7 a further colourshift device, wherein one reflector is an anisotropic scattering reflector;

FIG. 8 the combination of an anisotropic scattering layer on top of a reflecting cholesteric film;

FIG. 9 a device according to FIG. 8 with an additional surface protection coating;

FIG. 10 a device similar to the device of FIG. 9 with an anisotropic scattering film on the substrate and the surface coated with a reflection metal layer followed by an interface layer;

FIG. 11 a device similar to the device of FIG. 10 without metallic reflection layer but with an interface layer as a high or low index film;

FIG. 12 a device where the anisotropic scattering film is metallised and coated with the liquid crystalline cholesteric material;

FIG. 13 a device where the anisotropic scattering film is coated with the liquid crystalline cholesteric material and observed from the backside;

FIG. 14 a device where the anisotropic scattering film with large depth of the grooves/pits is coated with a dielectric film;

FIG. 15 geometrical patterns and their orientations of an anisotropic scattering layer with a graphical pattern;

FIG. 16 geometrical patterns and their orientations of an anisotropic scattering layer with a background that is not oriented; and FIG. 17 geometrical patterns and their orientations in an anisotropic scattering layer originating from a black and white picture and an isotropic background.

DETAILED DESCRIPTION OF THE PREFERRED EMBODIMENTS

The new optical devices disclosed in the present patent application are based on the inventive combination and merging of two different, upcoming security technologies (A) and (B) leading to a synergistically enhanced level of security. The technology (A) is related to a technology, which allows the generation of surface-relief images with pixels made of anisotropic scattering structures. The technology (B) includes technologies, which allow the generation of colourshift effects. In the present case the colourshift effect is due to layers that are based on cholesteric materials or layers that exhibit thin-film interference effects. A brief overview over these technologies shall be given below.

(A) Anisotropic Diffuser

Scattering can take place in transmission or reflection at many different material surfaces. For security applications, reflective devices are of more interest and will mainly be considered in this application. Scattered light from an isotropic scattering surface is characterised by an axial-symmetric scattering profile for small incident angle as illustrated in FIG. 1. If the scattering surface is not isotropic, however, but anisotropic, as illustrated in FIG. 2a, the outgoing light distribution is anisotropic as well. An anisotropic surface can e.g. be characterised by the anisotropy direction. The output light distribution depends therefore on the corresponding azimuthal angle. That means the scattered light is concentrated at certain azimuthal angles.

FIG. 1 correspondingly illustrates the illumination of an optical device exhibiting a scattering surface 1. Collimated incoming light 2 is redirected into new outgoing directions 3 with a characteristic axial-symmetric output light distribution and a characteristic divergence angle 4.

FIG. 2a on the other hand illustrates the illumination of an optical device with an anisotropic scattering surface 5. Collimated incoming light 2 is redirected into new outgoing directions with a characteristic output light distribution 6, which depends on the corresponding azimuthal angle 7, 7'.

FIG. 2b illustrates an example of an anisotropic diffuser 51 with patterned anisotropy, which is imagewise locally varying in pixellated manner. The directions 52, 53 indicate the direction of anisotropy in the individual pixels. An observer sees a positive or negative image 54, 55, depending on the viewing angle, which causes a positive/negative image flipping upon tilting or rotating the element.

It has to be pointed out that in the present context the anisotropic scattering surface has to be understood as a substantially nonperiodic optically effective structure which is additionally patterned. This differentiates these anisotropic patterned scattering surfaces from holographic structures, which are substantially periodic optically effective structures, i.e. in which the viewing angle dependency of (graphical) information stored within the structure is due to interference effects on the periodic structure. In case of these substantially periodic holographic surface structures this inherently leads to colourshift effects which are superimposed onto the viewing angle dependency of the graphical information. By contrast, the patterned anisotropic scattering surface does not lead to such so-called rainbow effects, i.e. the viewing angle dependency is on the one hand much more pronounced and distinct, i.e. having much more separated transmissions between different graphical elements, and on the other hand it is not superimposed by colourshifts or spectral "rainbow" effects, which are strongly angular dependent and therefore not clearly and unambiguously recognizable by the human eye.

With an adequate fabrication technique it is possible to generate micro-structured surfaces, where each pixel represents an anisotropic scattering area with its own anisotropy direction. The first optical effect of the here-described devices is based on such pixels. The optical appearance of such devices can be summarised as follows:

a) For scattering structures exhibiting high spatial frequencies, high-resolution images, logos, micro-text and similar are possible.

b) The observed intensity distribution of the image is viewing angle dependent and leads e.g. to a positive negative image flipping when the device is tilted or rotated.

c) If the scattering angles are large enough, the images can be seen under large viewing angles.

d) Since the here considered microstructures are non-periodic, no characteristic spectral colours are observed. This is in contrast to holograms, which hold structures that are periodic or are a combination of a few periodic structures. The non-periodic structures lead to dark and bright zones when no additional colour effecting layers are involved.

e) Devices based on properties a) to d) make the device look different from classical holograms.

For a cost effective fabrication of such devices in large volumes, it may be desirable that the scattering effect is due to surface effects and not due to bulk effects. In this case, the scattering surface structures might be replicated by conventional replication techniques. This involves the fabrication of a hard metal master shim, descendants of the master and the recombination and fabrication of a suitable work-tool with which thin-film replica can be generated e.g. by ultraviolet (UV) casting or hot embossing.

The development and fabrication of general optical scattering elements have a long tradition, but were limited for a long time to isotropic scattering devices. In the last few years also high-efficient uniform anisotropic scattering devices have been developed for various optical applications. Such scattering devices can be used as homogeniser and light shaping devices for different light sources or as brightness enhancement films in liquid crystal devices and are for instance disclosed in U.S. Pat. Nos. 5,534,386 and 6,522,374. The anisotropy of such diffusers is uniform over the whole optical device.

However, relatively few optical scattering devices exist, which retain pixels and not only areas that scatter light in predefined directions. In the last few years, applicant has developed such a technology. In a first step, a thin photopolymer film, an alignment layer, is coated on a suitable substrate. With the help of patterned linearly polarised UV light, for instance using one or more photomasks and repeated exposure (or single exposure with photomasks or polarizing masks leading to patterned irradiation in one step, or laser scanning methods etc.), a latent picture is written into this thin photo-alignment film. A more detailed description of this photo-alignment technology can for example be found in U.S. Pat. No. 5,389,698. The exposed photopolymer has the ability to align liquid crystal mixtures and crosslinkable liquid crystal prepolymers. In a second step, the above described patterned alignment layer is coated with a blend of crosslinkable and non-crosslinkable liquid crystal materials. This liquid crystalline blend is then cross-linked, preferably by exposing it to actinic irradiation (UV light). The process induces a phase separation and a cross-linking of the liquid crystal prepolymer and results in a corrugated thin-film with anisotropic scattering properties. The basic fabrication principles and the optical behavior are disclosed in WO-A-01/29148. With respect to the making of such anisotropic scattering layers the disclosure of the document WO-A-01/29148 is explicitly included herein. Optical security devices have been fabricated according to the described technique. Such devices retain very attractive and unique optical properties.

Apart from the optical properties already discussed above, this new device has the following features:

f) Since the optical properties of the described topological scattering structures are basically surface relief (or embossable) structures, it is possible to apply standard replication techniques to mass fabricate such devices at adequate costs once the master has been made available e.g. using a process as given above. Today, two popular and cost effective replication techniques are UV embossing and hot embossing (see for instance M. T. Gale: "Replication techniques for diffractive optical elements" in Microelectronic Engineering, Vol. 34, page 321 (1997)). Both techniques have proven to be compatible with the described anisotropic scattering surface-reliefs.

g) The fabrication process is based on a proprietary technology developed by the applicant and depends on novel material design on a molecular level for these applications. This proprietary technology additionally increases the security level.

Besides the described method other optical fabrication techniques can be used to generate patterned anisotropic surface-relief scattering films. Such techniques can e.g. be based on a thin resist film, which is patterned with a suitable beam writer (e.g. electron or laser). Another approach could be based on the exposure of a photoresist film with anisotropic, elliptical speckles. In order to obtain anisotropic scattering domains with different azimuthal orientation, multiple exposure with at least one mask is helpful.

(B) Colourshift Effects

Colourshift can, e.g., be generated by one or more appropriate layers. This means, the observer sees a certain colour when light is reflected (or transmitted) from the colourshifting layer and by tilting the device a clear colour change can be perceived. Two different colourshifting technologies are considered as outlined below.

Colourshift by Interference Effects

The first group of colourshift effects is obtained by the interference of light at thin optical films (e.g. J. A. Dobrowolski, "Optical thin-film security devices", in "Optical Document Security" ed. R. L. van Renesse, Artechouse Boston 1998). Many different compositions of layered thin-film systems are possible. A characteristic reflection spectrum is obtained e.g. at normal light incidence. The reflection or transmission spectra are shifted toward the short wavelength side as the incidence angle increases. Multi-layer thin-film systems, often combinations of dielectric and metallic layers, are also possible with dielectric materials only. In this case, thin-films of different index of refraction are required.

By combining one dielectric film between two metal films, where at least one is a partially transparent metal film, only three layers are required in order to obtain strong colour effects. Such a thin-film interference multi-layer system represents a Fabry-Perot-resonator. Chromium and Aluminum are two metals that are suitable for such applications and can be deposited on polymer films, e.g. by sputtering or evaporation.

Security devices have been fabricated based on either thin interference films or on flakes of such films. Examples can be found in U.S. Pat. Nos. 5,084,351 and 6,686,042.

Cholesteric Colourshifting Films

A second group of colourshifting layers usable for the here described devices are cholesteric films. The optical effect of cholesteric polymer liquid crystalline materials is currently used as thin-films or flakes in colourshifting inks as described e.g. in U.S. Pat. Nos. 4,780,383 and 6,414,092.

Planar oriented cholesteric material behaves as a reflector for a wavelength around $\lambda_0 = P_0 <n>$ for normal incident light, where $P_0$ means the pitch of the cholesteric material and $<n>$ is the average index of refraction of the cholesteric material for one sort of circularly polarised light (L. M. Blinov, Springer 1994 Electro-optic effects in liquid crystal materials). The width of the reflection band is proportional to the anisotropy of the cholesteric material, $\Delta\lambda = P_0 \Delta n$. The reflection band moves toward the short wavelength side as the angle of incidence $\theta$ increases:

$$\lambda(\theta) = P_0 \cdot \sqrt{\langle n \rangle^2 - \sin^2(\theta)}$$

For typical materials an orange reflection at normal incidence moves toward the green and blue at around 45° and under grazing incidence.

For the optical appearance of a colourshifting-based cholesteric film, the orientation of the cholesteric liquid crystalline material is important. Perfectly planar oriented cholesteric material with its optical (helix) axis perpendicular to the substrate will result in a not very attractive film since only specularly reflected light will be seen. In order to make the cholesteric film less viewing-angle sensitive, it is helpful to treat the substrate surface in such a way that the helix axis of the coated cholesteric material is randomly distributed around the substrate normal within a certain angle.

Typically, a single layer cholesteric film reflects only a relatively small portion of the total non-polarised visible light spectrum. In order to increase the amount of reflected and coloured light it is possible to add up additional cholesteric layers to broaden the spectral bandwidth or to include the other polarization state (left and right circularly polarised light). From the economical point of view this approach is not very satisfying because of the additional cost caused by the additional cholesteric layers. Another mean to increase the colour saturation is by selecting an appropriate background, which also contributes to the total reflected light. A black or non-reflecting background will give the most brilliant result.

On the other hand brighter and/or coloured backgrounds can also lead to very attractive colour effects, which appear differently than the colourshift effect of the classical cholesteric film on black background. A further extension of this approach is the doping of the cholesteric material with a dye such that a single layer of this dyed cholesteric material exhibits two colour contribution: the reflection by the cholesteric component and the absorption by the dye. A discussion on such colourshifting films is e.g. illustrated in F. Moia, "New colour shifting security devices", Optical Security and Counterfeit Deterrence Techniques V, San Jose, USA, 2004, Proceedings of SPIE, Volume 5310 (SPIE paper # 5310-32). Dyed cholesteric films are also suitable for the combination devices disclosed herein.

As discussed, new attractive security applications are possible with anisotropic scattering devices, which allow, in addition, the generation of pixelated or patterned microstructures. Each pixel or pattern holds its own azimuthal orientation. The present invention is based on the synergistic merging or combination of such anisotropic scattering structures with colourshift films including cholesteric materials or interference effects due to thin-film effects.

One way to combine an anisotropic scattering film with a colourshift film is by adding one type of layer on top of the other. The following examples include only reflection type devices. The transmissive counterparts of such devices are also achievable. It is understood that the observer looks from the top in the FIG. 3 to FIG. 14 and the device is glued, laminated or coated or otherwise applied onto or integrated with the object which has to be protected.

FIG. 3 illustrates the basic combination of an anisotropic scattering layer 10 on top of a reflecting interference film 11. Such a film holds all the properties of a scattering film and the properties of a colourshift interference film. The colour interference film 11 is coated, printed, laminated, hot- or cold-stamped on a typical plastic substrate 12 such as polyester, polyethylene, polypropylene, PET and similar as well as on glass, metal or specially prepared paper substrates 12. The anisotropic film 10 with the image or logo or any other information is on top of the layered film 11.

In a colourshift device according to FIG. 3 the surface relief 10 with the encoded image is unprotected and could be copied with a suitable replication technique. In order to protect this scattering surface-relief, an additional layer 13 can be coated on top of the device. This is exemplified in FIG. 4. FIG. 4 therefore illustrates a device analogous to the device of FIG. 3 but with an additional surface protection coating 13 with an adjusted index of refraction (low or high). Such protection coating 13 should have an index of refraction different from the scattering film 10. The scattering efficiency depends on the surface relief modulation depth d and the index of refraction difference on between the scattering n(10) and the protection film n(13): $\delta n = n(13) - n(10)$. It is therefore suitable to have an as large as possible value for $\delta n$ such that the surface-relief modulation depth is not too large. Recently, materials have been developed, which allow the manufacturer to wet-coat high index of refraction films. These materials are based on nanoparticles with a high index of refraction and retain a particle size such that no scattering occurs. One example for such a material is based on $TiO_2$ nanoparticles.

FIG. 5 illustrates a device analog to the device of FIG. 4 but in this case the scattering film 10 is coated/applied on the substrate 12 and the surface is coated with a reflection metal layer 14 covered by an interface layer 15. Finally the colourshift layer 11 is coated/applied on top of the device.

In the devices illustrated in FIG. 3 to 5, a general interference film 11 was used. This film may consist of various dielectric sub-films and/or may include absorbing, metal films. A simple interference film consists of three layers: two reflecting metal films and in-between at least one dielectric film. Such a Fabry Perot-resonator type composition can also be used for colourshift films in the context of the present invention.

Other possible structures based on such Fabry-Perot-resonators are illustrated in FIG. 6 and 7. In both cases, the spacer film 16 determines the distance between the two reflectors (14, 9 and 14, 17, respectively), which determines the colour that will be observed from the device.

FIG. 6 illustrates a colourshift device that represents a Fabry-Perot-resonator, where one reflector is an anisotropic scattering reflector 14. The metal layer 14 is semitransparent. In this case the reflector on the substrate is a flat mirror 9 and the out-coupling reflector is a partially reflecting scattering mirror 14. The out-coupling reflector 14 can be coated with a protection film 13.

FIG. 7 also illustrates a colourshift device that represents a Fabry-Perot-resonator and where one reflector is an anisotropic scattering reflector 14. In this case the reflector 14 on the substrate is the anisotropic scattering mirror and the out-coupling reflector is the flat semitransparent partially reflecting mirror 17. The out-coupling reflector 17 can be coated with a protection film 18.

Note that FIG. 6 and FIG. 7 illustrate colourshift devices, which are not only the mechanical combination of two films but represent an integrated structure ending up with an integrated combination of two optical effects within one structure.

The following Figures illustrate colourshift devices that are based on the combination of anisotropic scattering films with cholesteric colourshift devices.

FIG. 8 illustrates the basic combination of an anisotropic scattering layer 10 on top of a reflecting cholesteric film 20. Such an integrated film holds and combines all the properties of a scattering film and the properties of a colourshift interference film. The cholesteric film 20 is coated, printed, laminated, hot- or cold-stamped on a typical plastic substrate 12 such as polyester, polyethylene, polypropylene, PET and similar as well as on glass, metal or special prepared paper substrates 12 or on combinations or multi-layer structures thereof. The anisotropic scattering film 10 with the image or logo is on top of the layered film 20. The film 21 behind the cholesteric film 20, which could be the substrate or a film between the substrate and the cholesteric film 20 acts as a background film and significantly determines the optical appearance of the device. A black background film 21 e.g. causes basically the characteristic cholesteric reflection to take place. Coloured background films 21 will result in different colours. Many different combinations of characteristic cholesteric reflection and colour background absorber or reflector are possible and result in attractive devices.

Also in the device shown in FIG. 8, the surface relief of the anisotropic scattering film can potentially be replicated and therefore a protection film is suitable for sensitive applications. FIG. 9 illustrates a device analog to the device of FIG. 8 but with an additional surface protection coating 22 with an adjusted index of refraction (low or high).

It is also possible to incorporate the effect of the background film directly into the cholesteric layer by tinting the cholesteric materials with appropriate dyes. Such tinted cholesteric layers lead to different, surprising colourshifts when the device is tilted. For example, for a cholesteric material with a characteristic reflection in the green and a violet dye doping, a very significant colourshift can be observed from green at 0° to violet at larger angles (60°). This approach is useful for devices with the cholesteric film 20 underneath the anisotropic scattering film 10 when looking from the viewing direction.

FIG. 10 illustrates a device similar to the device of FIG. 9 but in this case the scattering film 10 is coated on the substrate and the surface is coated with a reflection metal layer 14 followed by an interface layer 23. It has to be noted that the interface layer 23 does not have to be specifically applied, but that the cholesteric film may also directly be applied to the scattering layer leaving a layer 23 with air. Finally a cholesteric colourshift layer 20 is coated on top of the device.

FIG. 11 illustrates a device similar to the device of FIG. 10 but in this case the metallic reflection layer 14 is not present and the interface layer is a high or low index film 31 such that a good reflection at the scattering film 10 and the index film 31 results. In addition the background film 30 will be important again as discussed above.

As said above the cholesteric film 20 can be coated as a cross-linked film by laminating the film on the device. Another possibility is to coat the cholesteric material in its liquid crystalline form and cross-link the material after the coating process by actinic irradiation (UV) or by applying heat, i.e. thermally. This approach has the advantage that the pores of a scattering film can be filled with the cholesteric liquid crystalline material and do not have to be protected in a further step. Such an approach is shown in FIG. 12.

FIG. 12 illustrates a device where the anisotropic scattering film 10 is metallised or partially metallised 14 and then coated with the liquid crystalline cholesteric material 20. After the coating, the cholesteric film 20 is crosslinked by UV light. This approach makes an interface layer shown in FIG. 11 obsolete and substantially simplifies the device. The device according to FIG. 12 also represents an integrated device in which the two optical effects are intimately connected with each other and realised within one single structure. In addition, instead of the metallisation also a colour or black background is conceivable.

FIG. 13 illustrates a device where the anisotropic scattering film 10 is coated with the liquid crystalline cholesteric material 20 and may also be observed from the backside. This simple configuration does obviously not require a protection cover film. Also the structure according to FIG. 13 represents an integrated device.

FIG. 14 additionally illustrates a very simple and fully integrated structure according to the present invention. In this case, the anisotropic scattering film 10 is applied on to the substrate 12, the surface of the anisotropic scattering film is metallised with a metal layer 14 which acts as a mirror, and on top of this metal layer 14 there is provided a dielectric layer 32. The metal layer 14 together with the dielectric layer 32 as well as the more pronounced average depth of the grooves on the anisotropic film gives rise to a combined colourshift/image-flipping effect. In case of the structure according to FIG. 14, the average depth of the grooves in the anisotropic scattering layer is typically in the range of 100 to 300 nanometers, while in the structures of the previous figures the average depth of the grooves is in the range of 50 to 150 nanometers.

It should be noted that even though an anisotropic scattering device with interference colourshift normally consists of a first (partial) reflector, a spacer layer, an anisotropic scattering layer, a second (partial) reflector and possibly a passivation film, it is possible to observe colour reflections already from such a device if one of the (partial) reflectors is not present, and furthermore, by making the scattering layer sufficiently thick, the spacer layer may be omitted.

Additionally, the spacer film, so far assumed to be a uniform transparent dielectric film, could also be made of a scattering material.

There are many possibilities to pattern the anisotropic layer such that a variety of optical effects turn up. FIG. 15 to 17 illustrate possible orientation-patterns in the anisotropic scattering layers. The parameters are the geometry of the participating zones, their azimuthal orientation, and the degree of anisotropy in combination with the angle dependent scattering characteristics. For more details reference is made to e.g. WO-A-01/29148. Beside the given examples in FIG. 15 to 17, many more arrangements are conceivable.

FIG. 15 illustrates the geometrical patterns and their orientations of an anisotropic scattering layer with a graphical pattern, which consists of a uniform background 40 and a graphical composition 41. The orientation of the scattering structures of the uniform background 40 is along the horizontal direction as indicated by horizontal lines. The actual graphical pattern 41 retains a single vertical alignment. Such a device will exhibit a clear positive negative flip depending on the viewing angle and illumination conditions.

FIG. 16 illustrates the geometrical patterns and their orientations of an anisotropic scattering layer of a graphical pattern and with a background 42 that is not oriented. The dotted area symbolises the non-oriented area. Various different graphical zones have their own orientations, symbolised by hashed areas of different orientations 43. This means by rotating or tilting such a device different graphical zones light up, depending on the orientation of the device, while the background always appears the same.

FIG. 17 illustrates the geometrical patterns and their orientations 44, 45 in an anisotropic scattering layer originating from a black and white picture and an isotropic background 42. For such a device a black and white picture is rastered, which means the picture area is subdivided into black and white picture elements of small size. The black and white zones are coded in the device with two anisotropic scattering directions, preferably with an orientation angle difference of 90°. In such a way pictures with grey scales can easily be reproduced and this arrangement will also show a positive-negative flip effect upon changing the viewing angle.

SPECIFIC EXAMPLES

For all listed examples, which will be described in more detail, anisotropic scattering patterns according to FIG. 15 have been used (two differing anisotropy orientations). With the use of one patterned chromium mask, security devices with graphical illustrations, rastered grey scales and high resolution images (pictures) have been obtained. The pixel size is around 20 micrometers but could be made larger as well as even smaller (<10 micrometers).

Example 1

A first example has been fabricated according to FIG. 3. As interference layer 11, a specially made three-layer Fabry-Perot reflector or an interference filter commercially available from Edmund Industrial Optics with a red reflection was used. Onto the interference layer 11 an anisotropic scattering film 10 was coated according to the film preparation described in WO-A-01/29148. As a photoalignment material, the material ROP103 from Rolic Technologies was used and coated with a film thickness of 30 to 60 nanometers by spin coating or by kbar coating. This film was exposed to UV light of a mercury vapor lamp of 1000 Watt in a Karl Suess housing and delivering about 3 mW/cm² of 305 nm linearly polarised UV light. The UV light was polarised with a Moxtek (US) linear polariser. The first UV exposure also involved a masking of the photoalignment layer with a patterned chromium mask. The first exposure with linearly polarised UV light was carried out at with azimuthal orientation $\alpha_1$. Then the chromium mask was removed and a second UV exposure with a new orientation was carried out at an azimuthal angle $\alpha_2$. Typical exposure energies are 100 and 20 mJ/cm² for the first and second UV light exposures. The patterned chromium mask retains the picture, graphical composition and/or microtext. The described device thus holds two different orientation directions for the dark and bright zones. For optimal contrast in a two-orientation-angle device the angle difference $\alpha_2-\alpha_1$ is adjusted to 90°.

In the next step, a scattering film with patterned anisotropy according to the pattern of the alignment layer was produced. The preparation of the liquid crystal/crosslinkable liquid crystal prepolymer solution used for it, the film coating (again spin-coating and kbar coating are possible) and the photo-induced phase-separation is described in the patent application WO-A-01/29148, and the corresponding disclosure of this document is explicitly included herein. Finally, a corrugated crosslinked diacrylate film 10 with anisotropic scattering properties results. Good optical performance for reflecting films have been obtained that retain a scattering film thickness of about 50 to 150 nanometers, measured with an atomic force microscope. An average period of the surface corrugation of 1 to 2 micrometers results in suitable viewing-angle dependence.

The distance between the interference film and the anisotropic scattering film is not crucial in the device described in the present example. It is therefore also possible to laminate a thin replicated film 10 carrying the anisotropic scattering structures onto the colour interference film 11.

At small viewing angles (measured from the device surface normal) the device appears red and at large viewing angles the colour of the device changes to orange and finally green. At the same time the characteristic positive-negative image flip of the patterned anisotropy is observed when tilting or rotating the device.

Example 2

A second example has been fabricated according to FIG. 6. In this case the anisotropic scattering film 10 is part of the interference film and therefore partly metallised 14. In a first step, a substrate 12 was metallised with aluminum by DC sputtering leading to the layer 9. The sputtering took place at an Argon flow of about 80 ml/min and a DC power of 300 W. The sample had a distance of 90 mm from the aluminum sputter target. The exposure time was 120 s. It resulted a highly reflecting aluminum film 9 for the visible wavelength range.

Then, a thin-film of a crosslinkable material was coated onto the metal reflector. In the present case a 15% diacrylate solution of butandiol-diacrylate (BDDA) in cyclopentanone was used. The solution was doped with 1% of BHT (Butylated Hydroxytoluene, also called 2,6,-di-(t-butyl)-4-hydroxytoluene) and 1% of the photoinitator Irgacure 369 of Ciba SC (CH). Again the film can be deposited by spin coating or kbar coating. The thickness of this spacer film 16 determines the colour of the final device as it dermines the cavity of the Fabry-Perot-resonator. In order to obtain attractive effects (colour hue and saturation), generally spacer film thicknesses of 100 to 400 nanometers are suitable.

On top of this spacer film an alignment layer and the anisotropic scattering film was deposited. The procedure is explained in Example 1.

On the anisotropic scattering surface a thin layer of metal 14, such as aluminum, was deposited by sputtering. The sputtering time was now much shorter, such that a semi-transparent aluminum film with a transmission of 30 to 60% resulted. After this procedure a device with vivid colours arose. By coating an additional polymer film 13 on the device the colour might change. For optimal brilliance an optimisation of spacer film thickness and top reflector transparence has to be carried out.

Again it is possible to fabricate the device by processing an existing replica of the anisotropic scattering film 10. In this case the replica of the anisotropic scattering film 10 is coated with a semitransparent aluminum film 14 followed by the spacer film 16. Finally a high reflecting metal film 9 is coated on the device and laminated on a carrier film 12. This design also corresponds to the FIG. 6 in the reversed order. Such a fabrication procedure could be automated in a roll-to-roll process.

At small viewing angles the device appears green and at larger viewing angles the colour of the device changes to magenta. At the same time the characteristic positive-negative image flip is observed when tilting or rotating the device.

Example 3

For this example, the fabrication process was analogous to Example 1, except that the interference film was now replaced by a cholesteric film 20. A cross-section through such a device is given in FIG. 8. A TAC (triacetate cellulose) film substrate of 125 micrometers was coated with a cholesteric film 20 by kbar coating. In order to obtain good wetting conditions, the substrate 12 was cleaned with a plasma cleaner, Technics Plasma 400 Cleaner. Typical cleaning parameter were 300 mL/min $O_2$ and 300 mL/min Ar at 300 W. No alignment layers were used.

For the production of the crosslinkable liquid crystalline layers, in the examples the following crosslinkable liquid crystal diacrylate components Mon1

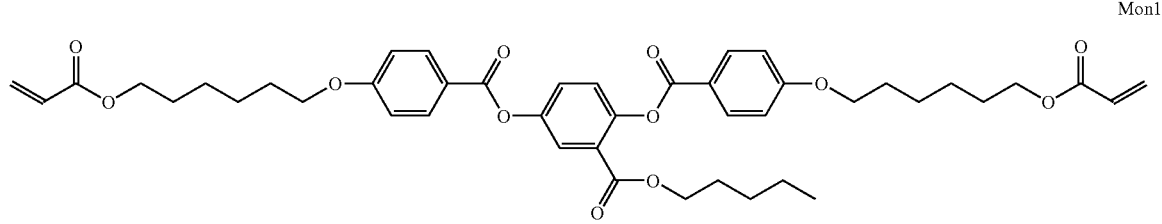

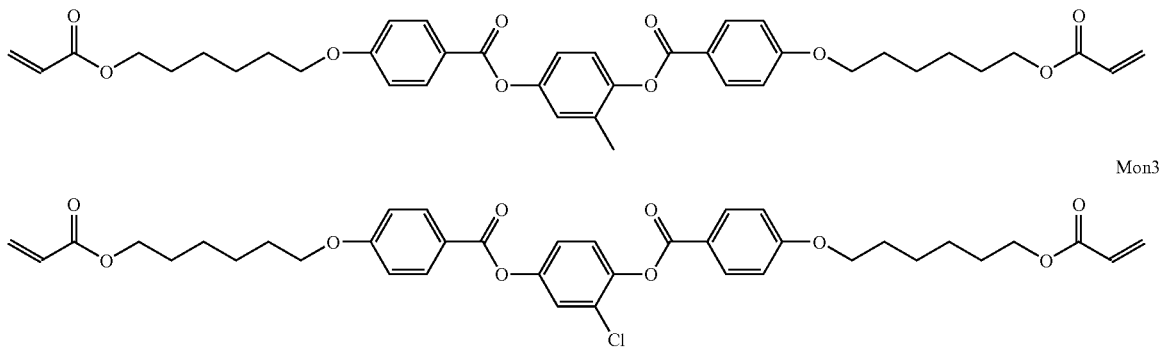

Mon2

Mon3 were used in a supercoolable nematic mixture (Mon1 80%, Mon2 15%, Mon3 5%) having a particularly low melting point (Tm 35° C.) thus making it possible to prepare the crosslinkable liquid crystalline layer at room temperature.

The nematic mixture was additionally doped with cholesteric material inducing a pitch. A suitable chiral dopant was e.g. ST31L which shows a left-handed helical sense.

ST31L:

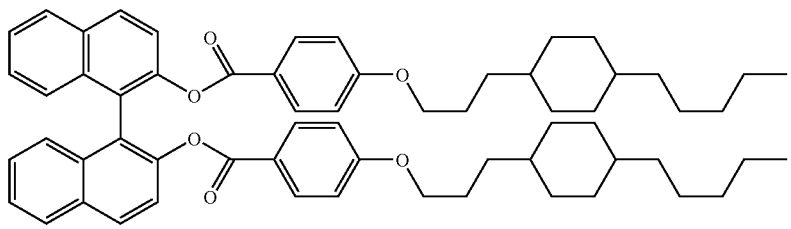

The concentration of the chiral dopant was 4% to 9%, more preferably 5% to 6%. This induces the desired reflective wavelength band in the visible range, but by changing the concentration, also reflective wavelength bands in the UV or IR range can be realized. By means of varying the concentration in a solvent such as MEK, it was possible to adjust the cholesteric crosslinkable liquid crystalline layer thickness over a wide range leading to different reflection properties. The thickness of the cholesteric layer was 1 to 10 micrometers, depending on the wavelength range intended.

Generally, several types of chiral dopants are known, which may be used for such cholesteric materials. Chiral dopants that in addition comprise polymerizable groups are for instance described in WO-A-98/55473, WO-A-99/64383, WO-A-00/02856 and WO-A-01/47862.

If required, well-known additives may also be present, such as e.g. phenol derivatives for stabilisation or photoinitators like Irgacure®. By means of varying the concentration, it was possible to adjust the layer thickness over a wide range. For cross-linking the liquid crystal monomers, the layers were exposed to isotropic light from a Xenon lamp in an inert atmosphere.

The chiral dopant concentration has been adjusted such that the reflection bands are in the green wavelength range. By tilting the device, the observed colour changes to blue. At the same time the characteristic positive-negative image flip is observed when tilting or rotating the device.

In this example, the anisotropic scattering film borders the air, which is not very satisfying, because the scattering micro-structure is not protected. The scattering surface can however be passivated by a thin-film 22 (FIG. 9) with an index of refraction different from the scattering film material. A suitable high index material is $TiO_2$ that can be coated by evaporation or in the form of nanoparticles. An illustration of such a device is shown in FIG. 9.

An important factor for the optical appearance is the background of the device. For brilliant colours, a strongly absorbing background (black paper) performs well. Coloured backgrounds with an adjusted reflection spectra are however attractive as well and result in attractive reflection effects.

Instead of choosing a coloured background, as already mentioned, it is also possible to dope the crosslinkable cholesteric material with a dye. Samples have been prepared according to FIG. 8 based on cholesteric films 20 with a characteristic green reflection for small viewing angles and a black background layer. Under a larger viewing angle the green colour shifts toward blue. In addition, the positive-negative image flip can be observed if the device is rotated or tilted.

The same cholesteric film 20 has also been doped with a violet dye such that the background does not contribute to the perceived device colour. At small viewing angles the characteristic green is still observed. Under a larger viewing angle the green colour shifts towards violet. In addition the positive-negative image flip can be observed if the device is rotated or tilted.

Example 4

A cross-section through the device according to this example is given in FIG. 12. In this example an anisotropic scattering film was prepared first. The surface was metallised 14 in order to make it reflective. The cholesteric liquid crystalline prepolymer (see Example 3) was coated on the reflective scattering surface 14 and cross-linked by UV light. This configuration has the advantage that the cholesteric film acts also as protection film on the top of the device and provides a fully integrated optical device.

Samples have been prepared with a characteristic green reflection. The picture of the corresponding anisotropic scattering film is clearly visible in two colours. The following table illustrates the perceived colours of the device.

| Zone | Appearance of anisotropic scattering image | Appearance of cholesteric film on anisotropic scattering image |
| --- | --- | --- |
| 1 | dark | green |
| 2 | bright | faint orange |

As the device is tilted, the green zone appears faint blue at a large viewing angle.

Example 5

This example illustrates a further possibility to use a single layer colourshift film of the type shown in FIG. 14. First, an anisotropic scattering film 10 with patterned anisotropy was prepared on a transparent substrate 12, such as glass or plastic, as described in Example 1. However, in this case the exposure of the solution containing the crosslinkable and non-crosslinkable materials to UV light was chosen in such a manner that deeper corrugation grooves resulted, as described in WO-A-01/29148. As with the previous examples, this scattering film could also be made by reproduction methods like hot embossing or UV casting using a suitable master shim.

Then, a reflective film 14 made of e.g. aluminum was deposited on the anisotropic scattering film 10 by sputtering or evaporation as described in Example 2. Finally, the corrugated surface may advantageously be passivated by a thin-film 32.

The device is observable through the transparent substrate. Several different devices of this kind have been fabricated showing reflection colours in the yellow, orange, red, violet, blue and green. The viewing angle under which the colour effect can be seen is somewhat limited; at angles for which the colour disappears, a dark/bright image without pronounced colours appears. In this context, it has been found that in contrast to the standard reflective anisotropic scattering films as discussed before and used in the other examples, which exhibit shades of white and grey and only faintly may show a coloration, films with a deeper modulation depth can result in clearly visible colour reflection images.

LIST OF REFERENCE NUMERALS

| | |
| --- | --- |
| 1 | isotropic scattering surface |
| 2 | incoming light |
| 3 | scattered light for isotropic scattering |
| 4 | divergence angle of 3 |
| 5 | anisotropic scattering surface |
| 6 | output light distribution for anisotropic scattering |
| 7, 7' | azimuthal angle of 6 |
| 9 | flat mirror |
| 10 | anisotropic scattering layer |
| 11 | reflecting interference film |
| 12 | substrate |
| 13 | protective layer |

-continued

LIST OF REFERENCE NUMERALS

| | |
| --- | --- |
| 14 | reflection metal layer |
| 15 | interface layer |
| 16 | spacer film |
| 17 | flat partially reflecting mirror |
| 18 | protection film |
| 20 | reflecting cholesteric film |
| 21 | background film |
| 22 | surface protection coating |
| 23 | interface layer |
| 30 | background film |
| 31 | index film |
| 32 | dielectric film |
| 40 | uniform background (oriented) |
| 41 | graphical representation |
| 42 | uniform background (not oriented) |
| 43 | graphical representation with areas of different orientations |
| 44 | geometrical pattern in first orientation |
| 45 | geometrical pattern in second orientation |
| 51 | anisotropic diffuser with patterned anisotropy |
| 52 | one direction of anisotropy |
| 53 | another direction of anisotropy |
| 54 | positive image |
| 55 | negative image |

The invention claimed is:

1. An optical component comprising
an anisotropic diffuser with patterned anisotropy; and
means for providing a colourshift observable upon changing viewing angle and/or changing angle of incident light,
wherein the anisotropy is imagewise locally varying and shows a viewing angle dependent positive/negative image flipping upon tilting or rotating of the optical component.

2. An optical component according to claim 1, wherein the anisotropic diffuser has a substantially nonperiodic optically effective structure.

3. An optical component according to claim 1, wherein the means for providing a colourshift are provided as a colourshift layer structure.

4. An optical component according to claim 3, wherein the anisotropic diffuser and the colourshift layer structure are located one behind the other as seen from the viewing direction.

5. An optical component according to claim 3, wherein the anisotropic diffuser and the colourshift layer structure are at least partially integrated.

6. An optical component according to claim 1, wherein the anisotropic diffuser is based on a liquid crystalline material, which may be polymeric, monomeric or oligomeric, crosslinkable or non-crosslinkable.

7. An optical component according to claim 1, wherein the anisotropic diffuser comprises a topologically structured corrugated surface structure.

8. An optical component according to claim 7, wherein the topologically structured corrugated surface structure is covered by a protective layer, by an interface layer or by a spacer film or by a reflection metal layer.

9. An optical component according to claim 7, comprising a topologically structured corrugated surface structure as obtainable by making a mixture of at least two materials of which one is crosslinkable and the other is non-crosslinkable, applying the mixture to a substrate, cross-linking at least a substantial portion of the crosslinkable material, and removing at least a substantial portion of the non-crosslinkable material, wherein preferentially the crosslinkable material is maintained in oriented state, e.g. by means of an underlying orientation layer or an orientating substrate surface, during cross-linking.

10. An optical component according to claim 1, wherein the means for providing a colourshift comprise an interference film or coating.

11. An optical component according to claim 10, wherein the interference film or coating comprises a multi-layer thin-film system based on dielectric materials, wherein the dielectric materials in different layers have different index of refraction.

12. An optical component according to claim 10, wherein the interference film or coating represents a Fabry-Perot-resonator.

13. An optical component according to claim 12, wherein the interference film or coating comprises at least one partially transparent first metal film, and a second metal film and between those metal films a dielectric layer.

14. An optical component according to claim 13, wherein the anisotropic diffuser with patterned anisotropy is provided on a substrate, wherein said anisotropic diffuser with patterned anisotropy comprises a topologically structured corrugated surface structure which is covered by a reflection metal layer, and wherein seen from the viewing direction said anisotropic diffuser is directly covered by the dielectric layer of the Fabry-Perot-resonator.

15. An optical component according to claim 1, wherein the means for providing a colourshift comprise a cholesteric film, layer or coating.

16. An optical component according to claim 15, wherein the cholesteric film or coating is tinted.

17. An optical component according to claim 15, wherein the cholesteric film is cross-linked.

18. An optical component according to claim 15, wherein the anisotropic diffuser with patterned anisotropy is provided on a substrate, wherein said anisotropic diffuser with patterned anisotropy comprises a topologically structured corrugated surface structure which is covered by a reflection metal layer, and wherein seen from the viewing direction said anisotropic diffuser is directly covered by the cholesteric layer.

19. An optical component according to claim 15, wherein the surface, layer or coating of the cholesteric film has a topologically structured corrugated structure and forms the anisotropic diffuser with patterned anisotropy.

20. An optical component according to claim 1, wherein the means for providing a colourshift are provided as at least one film which is applied by one of coating, printing, laminating or hot- or cold-stamping on a substrate, wherein the substrate is made of a material taken from the group consisting of polyester, polyethylene, polypropylene, PET or blends thereof or glass, metal or paper or combinations thereof.

21. An optical component according to claim 1, wherein means for providing a colourshift observable upon changing viewing angle and/or changing angle of incident light are coated, printed, laminated, glued, hot- or cold-stamped onto a substrate and subsequently covered with an anisotropic diffuser with patterned anisotropy or wherein means for providing a colourshift observable upon changing viewing angle and/or changing angle of incident light are coated, printed, laminated, glued, hot- or cold-stamped onto a substrate onto an anisotropic diffuser with patterned anisotropy.

22. An optical component according to claim 21, wherein a topologically structured corrugated surface structure as an anisotropic diffuser with patterned anisotropy is made by making a mixture of at least two materials of which one is crosslinkable and the other is non-crosslinkable, applying the mixture to a substrate, cross-linking at least a substantial portion of the crosslinkable material, and removing at least a substantial portion of the non-crosslinkable material, wherein the crosslinkable material is maintained in oriented state, by means of an underlying orientation layer or an orientating substrate surface, during cross-linking.

23. An optical component according to claim 21, wherein a topologically structured corrugated surface structure as an anisotropic diffuser with patterned anisotropy is made by one of ultraviolet casting or hot embossing using a three-dimensionally structured stamper.

24. An optical component according to claim 21, wherein the means for providing a colourshift comprise a cholesteric film, layer or coating which is made either by applying a cholesteric film, e.g. by lamination, or by coating a cholesteric material in its liquid crystalline form and cross-linking the material after the coating process, preferably either by using actinic irradiation or by using heat.

25. An optical component according to claim 1, wherein the optical component is a security element.

26. An optical component according to claim 25, wherein the security element is applied to or incorporated into a security document and wherein the security element may take the form of a tag, security strip, label, fibre, thread or patch.

27. A method of use An optical component according to claim 25, wherein the security element is applied as or incorporated into a brand or product protection device, and wherein the security element is one of a tag, security strip, label, fibre, thread or patch or combination thereof.

28. A method of use An optical component according to claim 25, wherein the security element is applied to or incorporated into means for packaging, and wherein the security element is one of a tag, security strip, label, fibre, thread or patch or combination thereof.

29. An optical component according to claim 1, wherein the optical component is provided for decorative applications.

30. An optical component as recited in claim 21 wherein said combining step comprises one of (1) covering said means with an anisotropic diffuser and (2) applying said means onto an anisotropic diffuser with patterned anisotropy.

31. An optical component according to claim 1, wherein the anisotropy is image wise locally varying in pixellated manner.

* * * * *